United States Patent Office 2,721,195
Patented Oct. 18, 1955

2,721,195

PENICILLIN SALT OF α-PHENYL-β-CYCLOHEXYL-AMINOETHYL CHLORIDE

Frank H. Buckwalter, Dewitt, and Alphonse P. Granatek, Syracuse, N. Y., assignors to Bristol Laboratories Inc., Syracuse, N. Y., a corporation of New York No Drawing. Application March 13, 1952,
Serial No. 276,456

2 Claims. (Cl. 260—239.1)

The present invention relates to a new, non-toxic, water-insoluble, amine salt of penicillin, more particularly a penicillin salt of α-phenyl-β-cyclohexylaminoethyl chloride, which is capable of exerting a repository antibiotic action and is also useful for oral, therapeutic administration and for external application and for use as a supplement in animal and poultry feeds.

The new penicillin salt of the present invention has the following formula

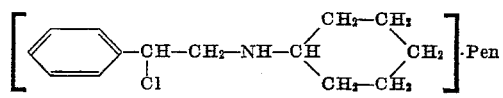

wherein Pen designates an acid penicillin radical or an active moiety thereof, capable of forming an addition salt with α-phenyl-β-cyclohexylaminoethyl chloride.

The product of the present invention may be obtained by reaction of penicillin acid with α-phenyl-β-cyclohexylaminoethyl chloride in a water-immiscible organic solvent and by the metathetical reaction of a water-soluble penicillin salt and a water-soluble salt of α-phenyl-β-cyclohexylaminoethyl chloride in water.

A more comprehensive understanding of this invention is obtained by reference to the following examples.

EXAMPLE I

*Alpha-phenyl-beta-cyclohexylaminoethyl chloride hydrochloride*

A solution of 109.6 g. (0.5 mole) of alpha-phenyl-beta-cyclohexylaminoethanol in 150 cc. benzene is added dropwise to an ice-cold, stirred solution of 95 g. (0.8 mole) of thionyl chloride in 500 cc. of benzene over a period of three hours. At the end of the addition the temperature is allowed to rise from 0° C. to room temperature and is stirred for three hours more. The precipitate of crude α-phenyl-β-cyclohexylaminoethyl chloride is collected by filtration, suspended in two liters of Skellysolve B (B. P. 60°–76° C.) overnight, recovered by filtration, dried in vacuo, and recrystallized successively from isopropyl alcohol-ether (once) and from methyl isobutyl ketone (three times) to give the crystalline product melting at about 162°–163° C.

Analysis:
Calculated for $C_{14}H_{21}Cl_2N$____ C, 61.31; H, 7.72; N, 5.11
Found_____ C, 61.4; H, 7.84; N, 5.22
C, 61.4; 7.82;

The product is moderately soluble in water, soluble in alcohols and moderately soluble in methyl isobutyl ketone.

EXAMPLE II

*Penicillin G salt of alpha-phenyl-beta-cyclohexylaminoethyl chloride*

0.15 g. of α-phenyl-β-cyclohexylaminoethyl chloride hydrochloride in 2.5 cc. of water is added to 0.198 g. of sodium penicillin G in 6 cc. of water. Upon scratching and cooling, the crystalline penicillin G salt of α-phenyl-β-cyclohexylaminoethyl chloride precipitates and is collected by filtration. This salt has a potency of about 1030 units/mgm. and is soluble in water at room temperature to the extent of about 200 units/cc.

EXAMPLE III

Potassium penicillin G (18.6 g.; 0.05 mole) is shaken with 75 ml. of 8.5% phosphoric acid and 150 ml. of ether in the cold until two clear layers result. The aqueous layer is withdrawn and discarded. The ether solution is filtered and then added all at once to a cold solution of 0.04 mole (9.5 grams) of freshly liberated α-phenyl-β-cyclohexylaminoethyl chloride in 50 ml. of ether. Crystalline penicillin G salt of α-phenyl-β-cyclohexylaminoethyl chloride precipitates and is collected by filtration.

While the present invention has been described with particular reference to the α-phenyl-β-cyclohexylaminoethyl chloride salt of penicillin G it will be understood that the α-phenyl-β-cyclohexylaminoethyl chloride salts of other penicillins are also included within the scope of this invention. For instance, penicillins such as the penicillins G, F, X, dihydro F, O and K and mixtures of two or more such penicillins, particularly such mixtures containing at least 85% of penicillin G, are included within the scope of this invention.

It will be understood that the reaction can be carried out in water-immiscible organic solvents other than ether. Examples of such solvents are butanol, amyl acetate, methyl amyl acetate, isopropyl ether, mesityl oxide, methyl isobutyl ketone, methylene dichloride, ethylene dichloride and chloroform. Recovery of the product may be increased by evaporating the solvent in vacuo at low temperatures.

It will be understood also that the ethereal solution of the free base may be prepared in ether by the use of caustic to liberate the free amine from an organic-solvent soluble or water soluble salt such as the hydrochloride, phosphate, nitrate, hydrobromide, sulfate, citrate, acetate and tartrate.

It will be understood that, without departing from the spirit of the invention or the scope of the claims, various modifications may be made in the specific expedients described as these are illustrative only.

We claim:
1. A salt of penicillin and α-phenyl-β-cyclohexylaminoethyl chloride.
2. A salt of penicillin G and α-phenyl-β-cyclohexylaminoethyl chloride.

References Cited in the file of this patent

UNITED STATES PATENTS

| | | |
|---|---|---|
| 2,547,640 | Goldman | Apr. 3, 1951 |
| 2,578,641 | Cooper | Dec. 11, 1951 |
| 2,598,508 | Cooper | May 27, 1952 |
| 2,654,746 | Rhodehamel | Oct. 6, 1953 |